US012522493B2

(12) United States Patent
Neumayer

(10) Patent No.: US 12,522,493 B2
(45) Date of Patent: Jan. 13, 2026

(54) DEVICE FOR FILLING CANS AND METHOD FOR OPERATING THE DEVICE

(71) Applicant: KRONES AG, Neutraubling (DE)

(72) Inventor: Walter Neumayer, Woerth/Donau (DE)

(73) Assignee: KRONES AG, Neutraubling (DE)

( * ) Notice: Subject to any disclaimer, the term of this patent is extended or adjusted under 35 U.S.C. 154(b) by 4 days.

(21) Appl. No.: 18/593,917

(22) Filed: Mar. 3, 2024

(65) Prior Publication Data

US 2024/0294369 A1 Sep. 5, 2024

(30) Foreign Application Priority Data

Mar. 3, 2023 (DE) ......................... 102023105234.9

(51) Int. Cl.
*B67C 3/26* (2006.01)

(52) U.S. Cl.
CPC .... *B67C 3/2614* (2013.01); *B67C 2003/2648* (2013.01); *B67C 2003/2657* (2013.01)

(58) Field of Classification Search
CPC .......... B67C 3/2614; B67C 2003/2657; B67C 2003/2648; B67C 3/26
See application file for complete search history.

(56) References Cited

U.S. PATENT DOCUMENTS 3,519,035 A 7/1970 Remane
5,156,200 A * 10/1992 Mette ........................ B67C 3/26 141/46
9,902,603 B2 2/2018 Clusserath et al.
2010/0037983 A1* 2/2010 Hiroya .................. B67C 3/2614 141/46
2012/0187073 A1* 7/2012 Conforti ................... B67B 3/22 53/471

FOREIGN PATENT DOCUMENTS

DE 3931834 A1 4/1991
DE 102016124216 B3 5/2018
WO WO 2014/139641 A1 9/2014

OTHER PUBLICATIONS

Driver et al., "Design of Aluminum Rolling Processes for Foil, Sheet, and Plate", Handbook of Metallurgical Process Design, pp. 69-114, Jan. 2004.

* cited by examiner

*Primary Examiner* — Jason K Niesz
(74) *Attorney, Agent, or Firm* — Caesar Rivise, PC

(57) ABSTRACT

A device for filling cans includes a filling valve, a gas channel and a seal. The seal is connected to the gas channel for receiving a compressed gas and is elastically deformable by the received compressed gas in a downward direction for pressing against a peripheral upper edge of a can positioned below the filling valve. Advantageously, the device can enable a secure sealing of the inlet gap between the can and the filling valve with comparatively low contact forces via the downwardly elastically deformable seal, so that even very thin-walled cans can be filled without risk of damage.

18 Claims, 3 Drawing Sheets

DEVICE FOR FILLING CANS AND METHOD FOR OPERATING THE DEVICE

CROSS REFERENCE TO RELATED APPLICATIONS

This application claims the benefit under 35 U.S.C. § 119(a) of German Patent Application No. DE 10 2023 105 234.9, filed Mar. 3, 2023 entitled DEVICE FOR FILLING CANS AND METHOD FOR OPERATING THE DEVICE, and whose entire disclosure is incorporated by reference herein.

TECHNICAL FIELD

The invention relates to a device for filling cans and a method for operating a device for filling cans.

TECHNICAL BACKGROUND

In filling systems for beverages, etc., the cans are generally connected gas-tight to the filling valve via a vertically movable centering bell while being filled with a carbonized filling material. The vertically movable centering bell is pressed against the peripheral upper edge of the can. The contact pressure can be generated, for example, by a differential pressure chamber of the filling element.

A disadvantage of this technique can be that the contact pressure of the centering bell is comparatively large. In particular, very thin-walled cans could therefore be damaged or undesirably deformed in the region of their peripheral upper edge, for example.

Other approaches for gas-tight filling of cans are known, for example, from U.S. Pat. Nos. 5,156,200 A and 3,519,035 A.

U.S. Pat. No. 5,156,200 A discloses a filling valve in a counter-pressure filling device for filling liquids into bottles or other types of containers with an open upper end. The filling valve is provided with a sleeve which can lower in the direction of an empty container below the valve and carries a deformable inner annular sealing element which can be moved into sealing engagement with the outer surface of the open end to center the container. A gaseous fluid then impinges on the sealing element in order to rest against the outer surface and to produce a reliable seal.

U.S. Pat. No. 3,519,035 A also discloses a dosing device with a peripheral seal.

The invention is based on the object of creating an improved technique for filling cans, which preferably also enables safe and damage-free filling of cans with very small wall thicknesses.

SUMMARY OF THE INVENTION

The object is achieved by the features of the independent claims. Advantageous developments are specified in the dependent claims and the description.

One aspect of the present disclosure relates to a device for filling cans, preferably for a filler carousel. The device has a filling valve for filling a can positioned under the filling valve with a (e.g., carbonized) filling material (e.g., a beverage). The device furthermore has a gas channel for conducting a compressed gas, preferably compressed air. The device furthermore comprises a (e.g., annular and/or bellows) seal. The seal is connected to the gas channel for receiving the compressed gas. The seal is elastically deformable by the received compressed gas in a downwards direction for pressing against a peripheral upper edge of the can positioned under the filling valve (e.g., by at least 3 mm, at least 4 mm or at least 5 mm).

Advantageously, the device can enable a secure sealing of the inlet gap between the can and the filling valve with comparatively low contact forces via the downwardly elastically deformable seal. As a result, very thin-walled cans can also be filled without the risk of the cans being deformed or otherwise damaged on their upper edge due to excessive contact forces. In tests, it could be determined, for example, that the contact force (axial force) from the downwardly elastically deformable seal could be reduced by about 20% compared to an embodiment with a vertically movable centering bell. In particular, the contact force could be reduced, for example, from 675 N with a vertically movable centering bell to 550 N with the downwardly elastically deformable seal. The embodiment with the downwardly elastically deformable seal can also enable a rigid construction of the device which works completely without a vertically movable centering bell and without lifting device(s), as a result of which the construction and the operation of the device can be substantially simplified. The hygiene of the device can also be thereby improved. The device can also be retrofitted easily into existing fillers such as filler carousels since existing pneumatic connections, which were previously used to fill the differential pressure chamber for the previously movable centering bell, for example, can be used to supply the seal with the compressed gas.

In one exemplary embodiment, the seal can be inflated by the compressed gas from the gas channel, and/or the seal can be elastically expanded by the compressed gas from the gas channel in the downward direction. Advantageously, a secure seal between the filling valve and the can can thus be achieved in a structurally simple manner with comparatively low contact forces.

In a further exemplary embodiment, the seal has on its underside an annular (e.g., substantially planar) contact surface which moves in the downward direction when the seal is elastically deformed by the received compressed gas for pressing against the circumferential upper edge of the can positioned under the filling valve. Advantageously, a secure seal between the filling valve and the can can thus be achieved in a structurally simple manner.

In one embodiment, the annular contact surface runs inclined relative to a horizontal plane, preferably in such a way that it increases from a peripheral inner edge of the annular contact surface towards a peripheral outer edge of the annular contact surface. Advantageously, the contact surface can thus provide a centering functionality with which the can can be centered under the filling valve.

In a further embodiment, the seal has an elastically deformable bellows section (e.g., with only one fold or several folds). Advantageously, in this way a comparatively large elastic deformability of the seal in the downward direction can be enabled.

In one embodiment variant, the seal has a preferably annular inner chamber into which the gas channel opens, and/or the seal has a substantially U-shaped cross section.

Advantageously, a seal that is inflatable in the downwards direction can thus be provided in a simple manner.

In a further embodiment variant, the device furthermore has a preferably shell-like cleaning cap, preferably a CIP cleaning cap. The cleaning cap under the filling valve and the seal are preferably movable (e.g., via a positioning apparatus of the device), preferably via a lifting movement and a pivoting or displacement movement of the cleaning cap (e.g., via the positioning apparatus). Particularly preferably, the cleaning cap can have a chamber into which the annular seal can be elastically deformed in the downward direction. Advantageously, a careful cleaning of both the filling valve and the seal can thereby be enabled.

In one exemplary embodiment, the seal (e.g., substantially completely) is arranged in a seal holder which is preferably only open in the downward direction. Advantageously, a downwards guidance of the seal with elastic deformation can thereby be achieved, as a result of which the stability of the seal in the applied or pressurized or elastically deformed state can also be improved.

In a further exemplary embodiment, the seal holder is formed on an inner peripheral side of the seal by a preferably sleeve-shaped housing part of the device, which guides the seal during elastic deformation in the downward direction and preferably has at least one section of the gas channel. Alternatively or additionally, the seal holder is formed on an outer peripheral side of the seal by a (e.g., further) preferably sleeve-shaped housing part of the device, which guides the seal in the downward direction with elastic deformation. Advantageously, the seal can thus be securely guided and stabilized while being pressed against the peripheral upper edge.

In one embodiment, the device is free of a vertically movable centering bell, and/or is free of a lifting device for vertically moving the filling valve, and/or is free of a lifting device for vertically moving a can support (e.g., support plate and/or can clamp/gripper) of the device for supporting the can during filling. Advantageously, this can significantly simplify the design and operation of the device and improve hygiene. Instead of the approach between the can and the filling valve via a centering bell and/or lifting device to seal between the filling valve and the can, this task can now be taken over by the downwardly elastically deformable seal.

A further aspect of the present disclosure relates to a filler carousel for a container processing installation. The filler carousel has a plurality of devices as disclosed herein, which are preferably arranged distributed around a circumference of the filler carousel.

Preferably, the container processing installation can be designed for manufacturing, cleaning, coating, checking, filling, closing, labeling, printing and/or packaging cans for liquid media, preferably beverages or liquid foods.

The cans can preferably be designed as beverage cans or food cans.

A further aspect of the present disclosure relates to a method of operating a device for filling cans, preferably as disclosed herein. The method comprises pressurizing a seal with a compressed gas (e.g., compressed air), so that the seal deforms elastically in a downward direction (e.g., by at least 3 mm, at least 4 mm or at least 5 mm) and presses against a peripheral upper edge of a can. The method further comprises filling the can (e.g., in a constant pressure filling process) with a (e.g., carbonated) filling material (e.g., a beverage) from a filling valve, while the seal is pressurized with the compressed gas and presses against the peripheral upper edge. The method can achieve the same advantages that have already been described with reference to the device. The same applies to the preferred exemplary embodiments of the method described below.

In one exemplary embodiment, the method further comprises at least one of the following:

- rinsing the can before filling while the seal is pressurized with the compressed gas and presses against the peripheral upper edge;
- prestressing the can before filling while the seal is subjected to the compressed gas and presses against the peripheral upper edge;
- releasing the seal after filling; and
- centering the can via a contact surface of the seal inclined relative to a horizontal plane, which moves downwards when the seal is elastically deformed from the pressurization and contacts the peripheral upper edge.

In a further exemplary embodiment, the method further comprises positioning a preferably shell-like cleaning cap, preferably a CIP cleaning cap, under the filling valve and the seal (e.g., via a positioning apparatus of the device and/or by a lifting and pivoting movement or a lifting and displacement movement). The method can furthermore comprise a cleaning of the filling valve and the seal via a cleaning fluid, while the cleaning cap is positioned below the filling valve and the seal. Particularly preferably, during cleaning, the seal can be pressurized with a compressed gas at least temporarily and/or repeatedly, so that the seal elastically deforms in a downward direction into a chamber of the cleaning cap.

In one embodiment, neither the can nor the filling valve executes a lifting movement in order for the filling valve and the can to approach one another before filling.

In a further embodiment, the can has a wall thickness of <0.14 mm, ≤ 0.13 mm, ≤ 0.12 mm, ≤ 0.11 mm or ≤ 0.1 mm.

The preferred embodiments and features of the invention described above can be combined with one another as desired.

BRIEF DESCRIPTION OF THE DRAWINGS

Further details and advantages of the invention are described below with reference to the accompanying drawings. In the figures.

The embodiments shown in the drawings correspond at least in part, so that similar or identical parts are provided with the same reference signs and reference is also made to the description of other embodiments or figures for the explanation thereof to avoid repetition.

DETAILED DESCRIPTION OF EMBODIMENTS

Figure 1:
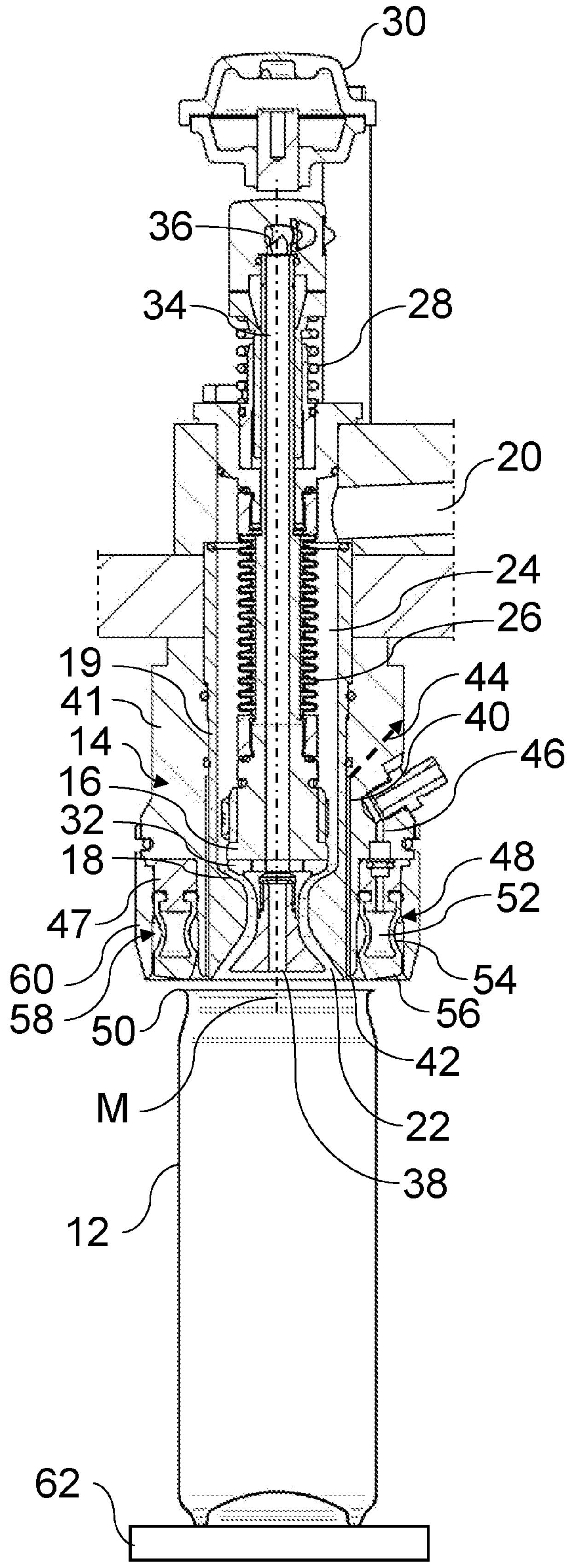
FIG. 1 shows a sectional view of a device for filling cans according to an exemplary embodiment of the present disclosure.
Figure 2:
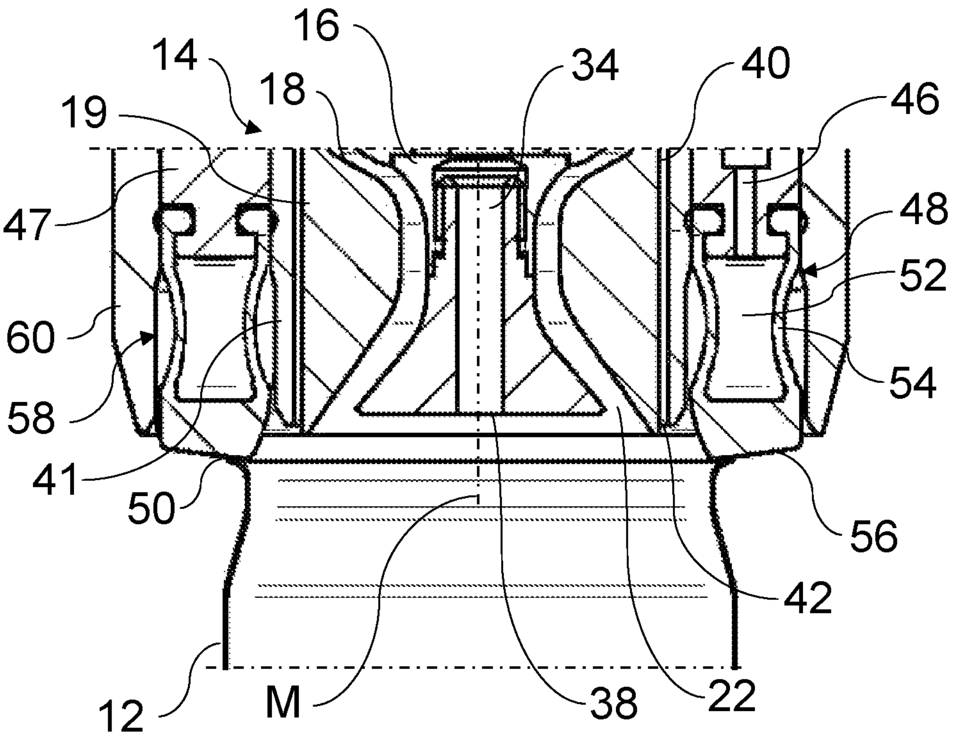
FIG. 2 shows a sectional view of a region of the exemplary device in which the seal is pressurized with a compressed gas.

FIG. 1 shows a device 10 for filling cans 12, and FIG. 2 shows a region of the device 10. FIG. 1 shows a seal 48 of the device 10, for example in a relaxed state. In FIG. 2, the seal 48 of the device 10 is shown by way of example in a pressurized state.

The device 10 can preferably fill the can 12 with a liquid or pasty filling material. The filling material can preferably be carbonized. Preferably, the device 10 can fill the can 12 in a so-called constant pressure filling method.

Preferably, a (can) filler can have a plurality of the devices 10 for the temporarily overlapping filling of a plurality of cans 12. The devices 10 can, for example, be arranged distributed on a circumference of the filler. The filler can preferably be designed as a rotary filler or a filler carousel. It is also possible for the filler to be a linear filler with a plurality of devices 10 arranged in one or more rows. In a can processing installation, the filler can be arranged upstream (from the cans) of a closing device for closing the cans.

The device 10 has a filling valve 14, a gas channel 46 and the seal 48. Optionally, the device 10 can also have, for example, a (further) gas channel 34, an (other) gas channel 40 and/or a can support 62.

The filling valve 14 can fill the can 12 positioned under the filling valve 14 with the preferably carbonized filling material. The filling valve 14 can have a movable valve member 16 for opening and closing the filling valve 14.

The valve member 16 can be movable along a central axis M of the filling valve 14. The central axis M can be a central longitudinal axis or vertical axis of the filling valve 14. The valve member 16 can be movable relative to a valve seat 18 of the filling valve 14. Preferably, the valve seat 18 can be a valve cone seat.

In an open position, the valve member 16 can release a fluid connection between a filling material supply line 20 and a filling material outlet 22 of the filling valve 14. The filling material supply line 20 can be connected to the filling valve 14. The filling material can flow from the filling material supply line 20 to an annular gap between the valve member 16 and the valve seat 18 and from there to the filling material outlet 22.

The filling material outlet 22 can, for example, be designed as an annular gap which is delimited on the inside by the valve member 16. The filling material outlet 22 can be arranged coaxially to the central axis M. The valve member 16 can preferably widen in a funnel-like manner in the region of the filling material outlet 22 towards a free end of the valve member 16.

The filling material can preferably flow through a filling material chamber 24 of the filling valve 14 on the path from the filling material supply line 20 towards the valve seat 18. The valve member 16 can extend through the filling material chamber 24. The valve member 16 can be sealed from the filling material chamber 24 with a bellows 26

In a closed position, the valve member 16 can block the fluid connection between the filling material supply line 20 and the filling material outlet 22 of the filling valve 14. The filling material from the filling material supply line 20 cannot pass the valve member 16 resting with sealing effect on the valve seat 18. There is no annular gap between the valve member 16 and the valve seat 18 for the filling material to pass through.

Preferably, the valve member 16 can be prestressed in a direction along the central axis M via an elastic element 28 of the filling valve 14. Preferably, the elastic element 28 can prestress the valve member 16 to be lifted off from the valve seat 16 to open the filling valve 14. For example, the valve member 16 can be prestressed by the elastic element 28 along the central axis M in an upward direction. The elastic element 28 can be, for example, a spring, preferably a helical compression spring.

Preferably, the valve member 16 can be movable in a direction along the central axis M via an actuator 30 of the filling valve 14. The actuator 30 can preferably move the valve member 16 against a prestressing direction caused by the elastic element 28. Preferably, the actuator 30 can move the valve member 16 to be lowered to the valve seat 16 for closing the filling valve 14. For example, the actuator 30 can move the valve member 16 downwards along the central axis M in one direction. For example, the actuator 30 can be a pneumatic actuator. Alternatively, the actuator 30 can be an electromagnetic actuator, for example.

The valve member 16 can have a ring seal 32 for sealing against the valve seat 18. The ring seal 32 can preferably be arranged on a conical section of the valve member 16.

The valve seat 18 can preferably be funnel-shaped. The valve seat 18 can be connected, preferably integrally, to a housing part 19 of the device 10. The housing part 19 can, for example, be sleeve-shaped. The valve member 16 can be movable within the housing part 19.

The gas channel 34 can extend parallel to the central axis M. The gas channel 34 can preferably extend through the valve member 16. A gas inlet 36 of the gas channel 34 can be arranged in an upper end region of the valve member 16. A gas outlet 38 of the gas channel 34 can be arranged in a lower end region of the valve member 16. For example, the filling material outlet 22 can extend annularly around the gas outlet 38. A compressed gas, e.g., a flushing gas and/or a prestressing gas, can be supplied to the can 12 via the gas channel 34. Accordingly, the gas inlet 36 can be, for example, in fluidic communication with a flushing valve and/or a prestressing valve (both not shown in the figures).

The gas channel 40 can extend parallel to the central axis M. The gas channel 40 can preferably extend as an annular channel, e.g. between two, preferably sleeve-shaped, housing parts 19 and 41 of the device 10. A gas inlet 42 of the gas channel 40 can be arranged in a lower end of the gas channel 40. For example, the gas inlet 42 can extend annularly around the filling material outlet 22. The gas channel 40 can open at its upper end into a gas channel 44. The gas channel 44 is shown only schematically in FIG. 1, since it is not cut in the cross-sectional plane of FIG. 1. Gas can escape or be discharged from the can 12 via the gas channel 40, e.g. flushing gas and/or prestressing gas and/or residual gas. Accordingly, the gas channel 40, 44 can be, for example, in fluidic communication with a discharge line and/or a discharge valve (both not shown in the figures).

The gas channel 46 can conduct a compressed gas, e.g. compressed air. The gas channel 46 can supply the compressed gas to the seal 48. The gas channel 46 can preferably extend parallel to the central axis M. The gas channel 46 can preferably extend through at least one, preferably sleeve-shaped, housing part 41 and/or 47 of the device 10. The gas channel 46 can be connected to a compressed gas source (not shown in the figures). Preferably, the gas channel 46 can be selectively connectable to the pressurized gas source to selectively pressurize or not pressurize the gas channel 46 with the compressed gas.

It is also possible for the gas channel 46 to discharge compressed gas from the seal 48, for example when the gas channel 46 is (selectively) separated from the compressed gas source and/or is selectively connected to a discharge line or to the surroundings.

The seal 48 can receive the compressed gas from the gas channel 46. The compressed gas from the gas channel 46 can pressurize the seal 48. In particular, the seal 48 is elastically deformable by the received and compressed gas in a (vertical) downward direction for pressing against a peripheral upper edge 50 of the can 12 positioned under the filling valve 14 (see also FIG. 2). The seal 48 can preferably be elastically deformed by the compressed gas by at least 3 mm, at least 4 mm or at least 5 mm in the downward direction for pressing against the upper edge 50. The downward direction is preferably parallel to the central axis M.

The peripheral upper edge 50 can delimit a top opening of the can 12. The peripheral upper edge 50 can be annular. The peripheral upper edge 50 can, for example, be a flanged edge of the can 12.

The seal 48 can assume a relaxed state when it is not pressurized by compressed gas from the gas channel 46 (see FIG. 1). The seal 48 can assume a pressurized state when it is pressurized by compressed gas from the gas channel 46 (see FIG. 2). In the pressurized state, the seal 48 can deform elastically in the downward direction.

While the seal 48 is pressurized with the compressed gas and elastically deformed in the downward direction and presses against the upper edge 50, the can 12 can be filled with the filling material via the filling valve 14. The can 12 can preferably be flushed and/or prestressed before filling, while the seal 48 is pressurized with the compressed gas and is elastically deformed in the downward direction and presses against the upper edge 50. The can 12 can, for example, be flushed and/or prestressed via the gas channel 34. After filling, the seal 48 can preferably be relaxed. During relaxation, the seal 48 can contract again. The filled can 12 can be transported further. After a new can 12 has been positioned under the filling valve 14, the seal 48 can again be pressurized with the compressed gas and elastically deformed in the downward direction and pressed against the upper edge 50 of the new can 12, so that it can also be rinsed, prestressed and/or filled.

In particular, the seal 48 can be inflated by the compressed gas from the gas channel 46 and/or can be elastically expanded in the downward direction. For example, the seal 48 can have an inner chamber 52, and/or a bellows section 54, and/or a substantially U-shaped cross-section.

The inner chamber 52 is preferably annular. With respect to the central axis M, the inner chamber 52 can extend coaxially to the valve member 16. The gas channel 46 can open into the inner chamber 52. For example, the inner chamber 52 can be surrounded by the bellows section 54. For example, the inner chamber 52 can be arranged between the three legs of the U-shaped cross-section. By supplying the compressed gas from the gas channel 46 into the inner chamber 52, the seal 48 can deform elastically in the downward direction.

The bellows section 54 is preferably annular. With respect to the central axis M, the bellows section 54 can extend coaxially to the valve member 16. The bellows section 54 can provide the elastic deformability of the seal 48. The bellows section 54 can have a fold, as shown, for example, in FIG. 1. It is also possible for the bellows section 54 to have a plurality of folds. The bellows section 54 can form the two vertical legs of the U-shaped cross-section of the seal 48.

Alternatively or additionally to the bellows section 54, the seal 48 can be elastically deformable, for example, by a differently shaped, elastically deformable section and/or by a material elasticity of a material of the seal 48.

The seal 48 can be secured on a preferably sleeve-shaped housing part 47 of the device 10, preferably in a force-fitting and/or form-fitting manner. For example, the seal 48 can be secured on the housing part 47 of the device 10 by its two ends of its U-shaped cross-section. The two ends can, for example, be secured in two annular grooves arranged opposite one another in the housing part 47. The two annular grooves can preferably extend in a plane perpendicular to the central axis M. The seal 48 can be thickened at the two ends.

The seal 48 can have an annular contact surface 56. The contact surface 56 can be arranged on a bottom side of the seal 48. During the elastic deformation of the seal 48 in the downward direction, the contact surface 56 can move downward to press against the peripheral upper edge 50.

The seal 48 can center the can 12 when it is elastically deformed by the compressed gas. In particular, the annular contact surface 56 can run inclined relative to a horizontal plane. The inclination can preferably be such that the contact surface 56 increases, preferably funnel-shaped, from a peripheral inner edge of the contact surface 56 towards a peripheral outer edge of the contact surface 56 (or in a radial direction away from the central axis M).

The seal 48 can be accommodated in a seal holder 58 of the device 10. The seal holder 58 is preferably annular. The seal holder 58 can extend coaxially around the central axis M. The seal holder 58 can be formed by at least one, preferably sleeve-shaped, housing part 41, 60 of the device 10. The seal holder 58 is preferably open only in the downward direction.

The seal holder 58 can preferably be formed on an inner peripheral side of the seal 48 by a, preferably sleeve-shaped, housing part 41. The housing part 41 can guide the seal 48 in the downward direction from the inside during the elastic expansion. The housing part 41 can block or at least limit elastic expansion of the seal 48 in a radial direction towards the central axis M.

The seal holder 58 can preferably be formed on an outer peripheral side of the seal 48 by a, preferably sleeve-shaped, housing part 60. The housing part 60 can guide the seal 48 in the downward direction from the outside during the elastic expansion. The housing part 60 can block or at least limit an elastic expansion of the seal 48 in a radial direction away from the central axis M. For example, the housing part 60 can be fastened to the housing part 41, for example via a screw connection.

For example, the seal holder can be formed on a rear side of the seal 48 by a, preferably sleeve-shaped, housing part 47. The housing part 47 can, for example, be arranged between the housing parts 19 and 60.

In the relaxed state of the seal 48, the seal 48 can be positioned completely within the seal holder 58. For example, when the seal 48 is in the relaxed state, the contact surface 56 of the seal 48 can be substantially flush with or recessed from a lower opening of the seal holder 58.

When the seal 48 is in the pressurized state, the seal 48 can protrude from the seal holder 58 in the downward direction. For example, the contact surface 56 of the seal 48 can protrude beyond the lower opening of the seal holder 58 when the seal 48 is in the pressurized state.

The can support 62 can support the can 12. The can support 62 can, for example, have a support plate which supports the can 12 on the bottom side. Alternatively or additionally, the can support 62 can, for example, have a can holder which supports the can 12 on a lateral surface of the can 12 (not shown in the figures). The can holder can be designed, for example, as a clamp, gripper or pocket.

The device 10 can preferably be free of a lifting device for vertically moving the filling valve 14 and free of a lifting device for vertically moving the can support 62.

Accordingly, neither the can 12 nor the filling valve 14 can perform a lifting movement for the filling valve 14 and the can 12 to approach one another before filling. Instead, the elastic deformation of the seal 48 can overcome the inlet gap between the filling valve 14 and the upper edge 50 of the can 12 and seal it during filling.

Figure 3:
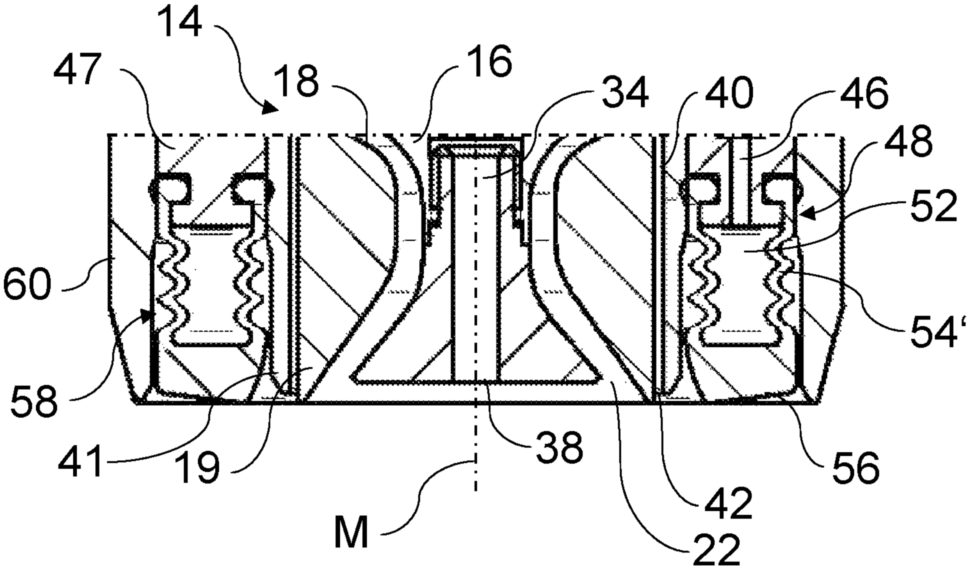
FIG. 3 shows a sectional view of a region of a modified device for filling cans according to an exemplary embodiment of the present disclosure.

FIG. 3 shows a detail of an embodiment modified with respect to FIGS. 1 and 2. In particular, the bellows section 54' of the seal 48 has a plurality of folds. The folds are arranged one above the other and connected to one another.

Figure 4:
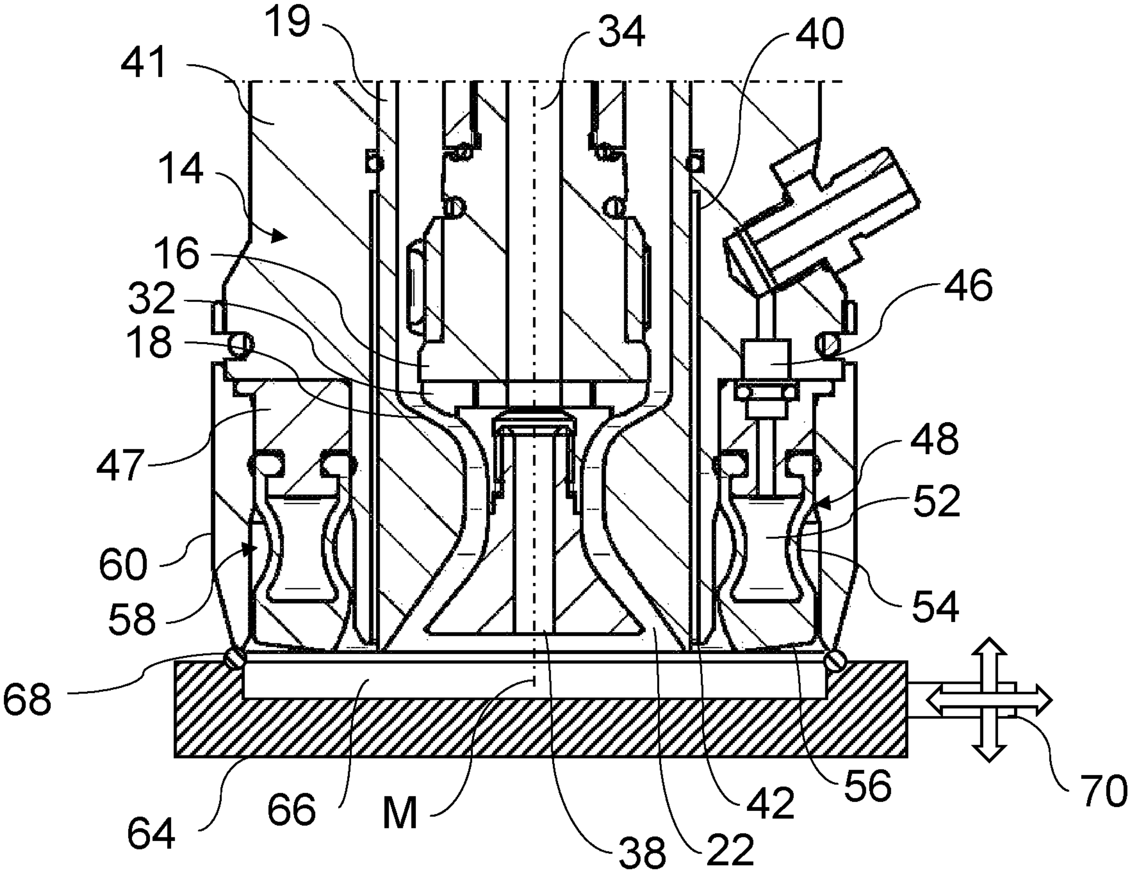
FIG. 4 shows a sectional view of a region of the exemplary device with an optional cleaning cap.

FIG. 4 shows an optional supplement for the device 10.

In particular, the device 10 can have a cleaning cap 64. The cleaning cap 64 is preferably designed as a so-called CIP cleaning cap or cleaning-in-place cleaning cap.

The cleaning cap 64 is preferably shell-shaped. The cleaning cap 64 can, for example, have a chamber 66. The chamber 66 can be open at the top or have an opening in the top side. The chamber 66 can, for example, have a trough-shaped, pot-shaped or omega-shaped cross-section.

The chamber 66 can preferably be dimensioned and arranged in such a way that the seal 48 can be deformed elastically into the chamber 66 in the downward direction when pressurized with the compressed gas. For example, the chamber 66 can have a diameter which is greater than or equal to an outer diameter of the seal 48 and/or of the seal holder 58.

An annular sealing element 68 can be arranged on an upper side of the cleaning cap 64. The sealing element 68 can surround the top opening of the chamber 66.

It is possible for a diameter of the sealing element 68 to substantially correspond to a diameter of an underside of the housing part 60. As a result, the sealing element 68 can seal between the cleaning cap 64 and the housing part 60 when it contacts with sealing effect the housing part 60 from below (see FIG. 4).

Alternatively, the diameter of the sealing element 68 can, for example, substantially correspond to an outer diameter of the housing part 60. As a result, the sealing element 68 can seal between the cleaning cap 64 and the housing part 60 when it contacts with sealing effect the housing part 60 on its outer circumference (not shown in FIG. 4).

The cleaning cap 64 can be moved via a positioning apparatus 70 shown purely schematically. For example, the cleaning cap 64 can perform a lifting movement, a horizontal pivoting movement and/or a horizontal displacement movement via the positioning apparatus 70.

To clean the filling valve 14 and the seal 48, the cleaning cap 64 can first be moved via the positioning apparatus 70 towards an underside of the filling valve 14 and the seal 48, preferably in such a way that the sealing element 68 contacts with sealing effect the housing part 60, e.g. from below or from the outside. The positioning apparatus 70 can preferably first move the cleaning cap 64 under the filling valve 14 and the seal 48 via a horizontal pivoting movement. The positioning apparatus 70 can then bring the cleaning cap 64 closer to the filling valve 14 and the seal 48, preferably in a vertical stroke movement, until the sealing element 68 comes into contact with the housing part 60.

If the cleaning cap 64 is arranged sealed under the filling valve 14 and the seal 48, the actual cleaning of the filling valve 14 and the seal 48 can take place. For example, a cleaning fluid can be supplied to the filling valve 14, which flows through the filling valve 14 and chamber 66 and thereby cleans the filling valve 14 and the seal 48.

To support cleaning, the seal 48 can be pressurized with the compressed gas during cleaning. The seal 48 can then deform elastically in the downward direction into the chamber 66 of the cleaning cap 64 and, for example, enable improved flushing of the seal 48. The pressurization with the compressed gas can take place, for example, only temporarily during cleaning and/or sequentially several times during cleaning.

The invention is not limited to the preferred exemplary embodiments described above. Rather, a plurality of variants and modifications are possible which likewise make use of the inventive concept and therefore fall within the scope of protection. In particular, the invention also claims protection for the subject matter and the features of the dependent claims, irrespective of the claims to which they refer. In particular, the individual features of independent claim 1 are each disclosed independently of one another. In addition, the features of the dependent claims are also disclosed independently of all of the features of independent claim 1 and, for example, independently of the features relating to the presence and/or the configuration of the filling valve, the gas channel and/or the seal of independent claim 1. All ranges specified herein are to be understood as disclosed in such a way that all values falling within the respective range are individually disclosed, e.g., also as the respective preferred narrower outer limits of the respective range.

LIST OF REFERENCE SIGNS

10 Device for filling cans
12 Can
14 Filling valve
16 Valve member
18 Valve seat
19 Housing part
20 Filling material supply line
22 Filling material outlet
26 Bellows
24 Filling material chamber
28 Elastic element
30 Actuator
32 Ring seal
34 Gas channel
36 Gas inlet
38 Gas outlet
40 Gas channel
41 Housing part
42 Gas inlet
44 Gas channel
46 Gas channel
47 Housing part
48 Seal
50 Upper edge
52 Inner chamber
54 Bellows section
56 Contact surface
58 Seal holder
60 Housing part
62 Can support
64 Cleaning cap
66 Chamber
68 Sealing element
70 Positioning device
M Central axis

What is claimed is:

1. A device for filling cans, having:

a filling valve for filling a can positioned below the filling valve with a filling material;

a gas channel for guiding a compressed gas; and a seal which:

is connected to the gas channel for receiving the compressed gas, and is elastically deformable by the received compressed gas in a downward direction for pressing against a peripheral upper edge of the can positioned under the filling valve, wherein at least one of:

the seal can be inflated by the compressed gas from the gas channel;

the seal has an elastically deformable bellows section;

the seal has an inner chamber into which the gas channel opens, and the seal has a substantially U-shaped cross-section.

2. The device according to claim 1, wherein:

the seal can be elastically expanded by the compressed gas from the gas channel in the downward direction.

3. The device according to claim 1, wherein at least one of:

the device is free of a vertically movable centering bell, and the device is free of a lifting device for one of vertically moving the filling valve and vertically moving a can support of the device for supporting the can during filling.

4. The device according to claim 1, further comprising:

a cleaning cap, wherein the cleaning cap can be moved under the filling valve and the seal, wherein the cleaning cap has a chamber into which the annular seal is elastically deformable in the downward direction.

5. The device according to claim 4, wherein the cleaning cap is shell-like cleaning-in-place cleaning cap.

6. The device according to claim 1, wherein:

the seal has an annular contact surface on its underside which, when the seal is elastically deformed by the received compressed gas, moves in the downward direction to press against the peripheral upper edge of the can positioned under the filling valve.

7. The device according to claim 6, wherein:

the annular contact surface runs inclined relative to a horizontal plane.

8. The device according to claim 7, wherein the annular contact surface runs inclined relative to the horizontal plane in such a way that the annular contact surface increases from a peripheral inner edge of the annular contact surface towards a peripheral outer edge of the annular contact surface.

9. A method for operating a device for filling cans, the device configured according to claim 1, wherein the method comprises:

pressurizing a seal with a compressed gas, so that the seal deforms elastically in a downward direction and presses against a peripheral upper edge of a can; and filling the can with a filling material from a filling valve while the seal is pressurized with the compressed gas and presses against the peripheral upper edge.

10. The method according to claim 9, further comprising at least one of the following:

rinsing the can before filling while the seal is pressurized with the compressed gas and presses against the peripheral upper edge;

prestressing the can before filling while the seal is pressurized with the compressed gas and presses against the peripheral upper edge;

releasing the seal after filling; and centering the can via a contact surface of the seal inclined relative to a horizontal plane which moves downwards during the elastic deformation of the seal from the pressurization and contacts the peripheral upper edge.

11. The method according to claim 9, wherein at least one of:

neither the can nor the filling valve performs a lifting movement for the filling valve and the can to approach one another before filling and;

the can has a wall thickness of at most 0.14 mm.

12. The device according to claim 1, wherein the seal is arranged in a seal holder.

13. The device according to claim 12, wherein the seal holder is open only in the downward direction.

14. The device according to claim 12, wherein at least one of:

the seal holder is formed on an inner peripheral side of the seal from a first housing part of the device which guides the seal downwards during elastic deformation in the downward direction; and the seal holder is formed on an outer peripheral side of the seal from a second housing part of the device which guides the seal in the downward direction during elastic deformation.

15. The device of claim 14, wherein the first housing part is sleeve-shaped, the seal holder has at least a section of the gas channel, and the second housing part is sleeve-shaped.

16. A device for filling cans, comprising:

a filling valve for filling a can positioned below the filling valve with a filling material;

a gas channel for guiding a compressed gas: and a seal which:

is connected to the gas channel for receiving the compressed gas, and is elastically deformable by the received compressed gas in a downward direction for pressing against a peripheral upper edge of the can positioned under the filling valve, wherein at least one of:

the seal has an elastically deformable bellows section the seal has an inner chamber into which the gas channel opens, and the seal has a substantially U-shaped cross-section.

17. The device according to claim 16, wherein the inner chamber is annular.

18. A method for operating a device for filling cans, comprising:

pressurizing a seal with a compressed gas, so that the seal deforms elastically in a downward direction and presses against a peripheral upper edge of a can;

filling the can with a filling material from a filling valve while the seal is pressurized with the compressed gas and presses against the peripheral upper edge;

positioning a cleaning cap under the filling valve and the seal; and cleaning the filling valve and the seal via a cleaning fluid while the cleaning cap is positioned below the filling valve and the seal, wherein the seal is pressurized with a compressed gas at least one of temporarily and repeatedly during the cleaning, so that the seal elastically deforms in a downward direction into a chamber of the cleaning cap.

* * * * *